US010366072B2

United States Patent
Lad et al.

(10) Patent No.: US 10,366,072 B2
(45) Date of Patent: Jul. 30, 2019

(54) DE-DUPLICATION DATA BANK

(71) Applicant: CATALOGIC SOFTWARE, INC., Woodcliff Lake, NJ (US)

(72) Inventors: Kamlesh Lad, Woodcliff Lake, NJ (US); Peter Chi-Hsiung Liu, Paramus, NJ (US)

(73) Assignee: CATALOGIC SOFTWARE, INC., Woodcliff Lake, NJ (US)

(*) Notice: Subject to any disclaimer, the term of this patent is extended or adjusted under 35 U.S.C. 154(b) by 211 days.

(21) Appl. No.: 14/246,078

(22) Filed: Apr. 5, 2014

(65) Prior Publication Data

US 2014/0222770 A1    Aug. 7, 2014

Related U.S. Application Data

(60) Provisional application No. 61/809,212, filed on Apr. 5, 2013.

(51) Int. Cl.
*G06F 16/23* (2019.01)
*E21D 20/02* (2006.01)
*E21D 21/00* (2006.01)

(52) U.S. Cl.
CPC ......... *G06F 16/2365* (2019.01); *E21D 20/02* (2013.01); *E21D 21/008* (2013.01)

(58) Field of Classification Search
CPC combination set(s) only.
See application file for complete search history.

(56) References Cited

U.S. PATENT DOCUMENTS

| 8,290,911 | B1 | 10/2012 | Janakiraman et al. |
| 8,356,021 | B2* | 1/2013 | Williams ......... G06F 17/30067 707/696 |
| 8,370,305 | B2* | 2/2013 | Petrocelli ............. G06F 3/0608 707/640 |
| 2006/0059207 | A1* | 3/2006 | Hirsch ................ G06F 11/1453 |
| 2007/0156842 | A1* | 7/2007 | Vermeulen ........ G06F 17/30212 709/217 |
| 2008/0270436 | A1 | 10/2008 | Fineberg |
| 2010/0094817 | A1 | 4/2010 | Ben-Shaul |
| 2012/0323860 | A1 | 12/2012 | Yasa et al. |

FOREIGN PATENT DOCUMENTS

WO    2010045262    4/2010

* cited by examiner

*Primary Examiner* — Shyue Jiunn Hwa
(74) *Attorney, Agent, or Firm* — Foley Hoag LLP; Erik Huestis; Robert Piston

(57) ABSTRACT

Facility for transferring data over a network between two network endpoints by transferring hash signatures over the network instead the actual data. The hash signatures are pre-generated from local static data and stored in a hash database before any data is transferred between source and destination. The hash signatures are created on both sides of a network at the point where data is local, and the hash database consists of hash signatures of blocks of data that are stored locally. The hash signatures are created using different traversal patterns across local data so that the hash database can represent a larger dataset then the actual physical storage of the local data. If no local data is present, then arbitrary data is generated and then remains static.

15 Claims, 4 Drawing Sheets

DE-DUPLICATION DATA BANK

CROSS-REFERENCE TO RELATED APPLICATIONS

This application claims the benefit of U.S. Provisional Application No. 61/809,212, filed Apr. 5, 2013, the entire disclosure of which is hereby incorporated by reference.

BACKGROUND

The present disclosure relates to data transfer, and more particularly relates to high performance transfer of large amounts of data over a network. The present disclosure is applicable to backup and restoration of data, disaster recovery, audio and video transfer, and in general to applications that requires network transfer of data.

The ability to transfer large amounts of data via a network is a limiting factor in various data processing operations. Compression algorithms may be used to provide better utilization of network bandwidth or storage resources. Similarly, source-side de-duplication may be used to remove duplicate data prior to transfer. Processes such as these may be applied to reduce the amount of data sent over a network connection, either by reducing the size of the data prior to sending, or by avoiding retransmission of duplicate data.

However, such methods do not address situations in which no data has yet been transferred to a destination, prior to an initial copying step. Such methods also do not address situations in which unique data needs to be transferred or in which data cannot be efficiently compressed.

Thus, there remains a need for an efficient and economic methods and systems for data de-duplication in networked computer operating environments. Such methods and systems are suitable for use in distributed backup systems, where a plurality of local and remote systems must be backed up, synchronized, and mirrored on a routine basis.

BRIEF SUMMARY

The following summary is provided as an introduction to the disclosure, and neither it nor the attached abstract should be understood as a complete description or characterization of the subject matter.

In one aspect, the present disclosure concerns facilities for the efficient transfer of data over a network between two or more network endpoints by transferring a "fingerprint" corresponding to the data, instead of transferring the actual data.

In another aspect, a database of fingerprints, each associated with a data chunk, is maintained at a destination site, so that data chunks may be re-used in updating target storage local to the destination. In one such embodiment, the corresponding data chunks may also be maintained as a separate collection in a local data source. In such embodiments, the fingerprints may be pre-generated from local static data (which may reside in the local data source), before any data is transferred between source and destination. The fingerprints may be created on both sides of a network connection from the point where data is local. The fingerprint database in such as case may include the fingerprints for chunks of data that are stored locally (in the local data source), and data associating the fingerprints with the corresponding chunks, for example data identifying the blocks, and/or locating the blocks in physical or logical storage.

In another embodiment, a fingerprint may be created by one or more alternative methods so that the fingerprint database can represent a larger dataset than the actual physical storage of the local data. In one implementation, this may be accomplished with fingerprints consisting of hash signatures, by using different traversal patterns across local data. In such a case, each hash signature would correspond to a plurality of data chunks. At least one of the corresponding data chunks will reside in local physical storage; the remainder may be generated based on the mechanism that was used to generate the alternate hash signature.

In another embodiment, if no local data is present, arbitrary or random data can be generated and then remain static (e.g., in the local data source).

In another aspect of the present disclosure, a method and computer program product for data transfer are provided. A first hash value is generated of a first data chunk based on a first traversal order of the first data chunk. A second hash value of the first data chunk is generated based on a second traversal order of the first data chunk. The first hash value and a specification of the first traversal order are stored in a data store. The second hash value and a specification of the second traversal order are stored in the data store. A third hash value is received. The third hash value is determined to be present in the data store. A third data chunk is determined corresponding to the third hash value based on a third traversal order in the data store.

Systems may be provided to carry out de-duplication operations as herein described. Such systems may include dedicated systems adapted to perform as a de-duplication, synchronization, and/or backup appliance.

The foregoing and other related techniques will allow faster transfer of data between network connections when compression and source-side de-duplication are not effective. Other objects and advantages of the disclosure will be clear from the drawings and the detailed description that follows.

BRIEF DESCRIPTION OF THE DRAWINGS

The disclosure will be better understood with reference to the accompanying drawings, in which.

DETAILED DESCRIPTION

Figure 1:
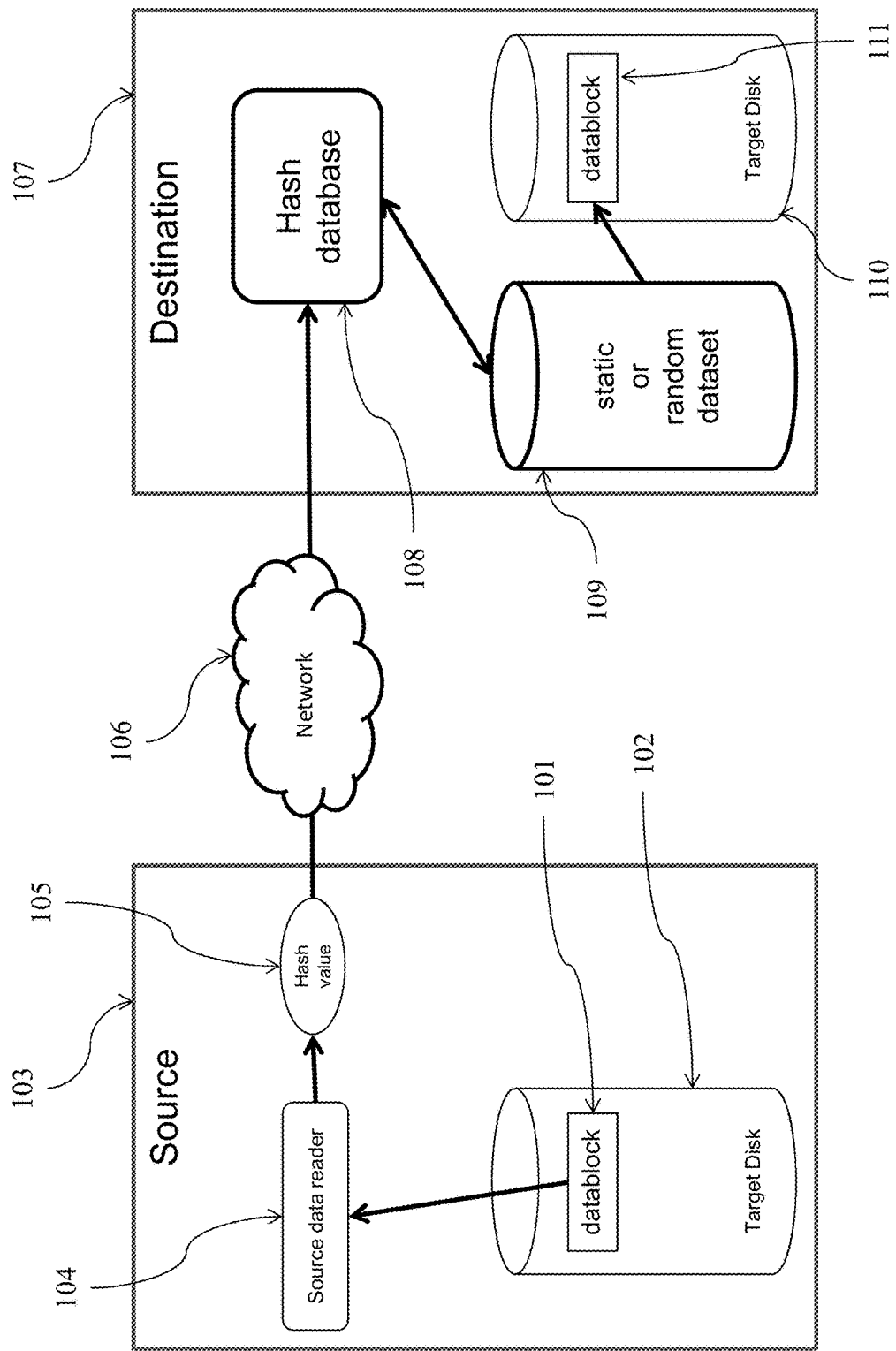
FIG. 1 is a block diagram showing an overview of an embodiment of the disclosed subject matter.

The following is a description of several preferred embodiments of various aspects of the disclosed subject matter, showing details of how systems may be constructed to carry out various aspects of the disclosure, and the steps that can be employed to utilize such systems and to practice such methods. These embodiments are illustrative only, and the disclosed subject matter is by no means limited to particular examples shown. The specific features of any particular embodiment should not be understood as limiting the scope of what is claimed.

In addition, it should be understood that the accompanying figures are presented for illustrative purposes only. The disclosed methodology and system are each sufficiently flexible and configurable such that they may be utilized in ways other than those depicted.

In various embodiments, program instructions are provided. Such program instructions may be recorded on non-transitory machine-readable media. Non-transitory machine-readable media include computer-readable media exclusive of transitory signals per se, such as radio waves or other freely propagating electromagnetic waves, electromagnetic waves propagating through a waveguide or other transmission media, or electrical signals transmitted through a wire. Examples of non-transitory machine-readable media include, without limitation, hard disks drives, solid-state drives, other optical and magnetic storage media known in the art, random access memory (RAM), read-only memory (ROM), erasable programmable read-only memory (EPROM), compact disc (CD), DVD, floppy disks, and punch cards.

Various operations described herein may be carried out by one or more computer processors. Suitable processors include general those present in general purpose computers, special purpose computers, and ASICs. Operations executable by such processors include transmission and receipt of data via a network. In various embodiments, transmission and reception may be performed via a network interface. Suitable data networks include LANs, WANs, and the Internet. In other embodiments, logic may be provided in the form of discrete logic or programmable logic arrays, which perform the specified operations through a combination of hardware elements.

Various embodiments described herein may be used to perform deduplication, backup, synchronization, mirroring, and other operations. Certain examples will be directed specifically to backup for purposes of simplicity. However, it should be understood that the principles illustrated may be extended to synchronization and mirroring. For example, a backup scheme based on hash comparisons against a database and local data source for corresponding data chunks may be extended to synchronization by a further hash comparison with hashes generated from the local file being synchronized.

De-duplication may be employed locally to reduce redundancy in stored data. When applied locally, de-duplication may include elimination of duplicate files, or duplicate data chunks. A data chunk may be a block or data record according to a file system specification. A block may have a fixed block size, however a chunk in general may have a variable size. A data chunk may also be a physical portion of data on a storage medium, such as a track, sector, or cluster.

De-duplication may also be employed in connection with a data transfer from a source node to a destination node. The source and destination may be connected by a network, a bus, fiber optic link, or other data carrier. In an exemplary application of de-duplication to data transfer, de-duplication is performed on the source node. In this de-duplication step, fingerprints are computed of various chunks of data. A fingerprint is a function such as a hash function that maps data to a digest. The fingerprints of the source data are checked for duplicates. A duplicate fingerprint is indicative of duplication between the associated chunks of data. Once duplicate data is found, one of the duplicates may optionally be removed from the source node. Upon removal, a filesystem of the source node may be modified so as to substitute the remaining chunk for the removed chunk in file system metadata.

Duplicate data need not be transmitted over the network from the source node to the destination node. Thus, when data is transmitted, the source node indicates to the destination node that duplicate data can be reused. In this way, use of network resources is reduced.

Similarly, the source node can provisionally send a list of fingerprints to the destination node in advance of sending any data chunks. A list of fingerprints may also be pre-generated at the destination node, for example, based on local de-duplication. Upon receipt of the fingerprints of a proposed transfer, the destination compares those to the fingerprints of data already present. The destination node may then request only those chunks of data that it does not already have access to locally. In this way, the destination node may make use of existing data to minimize network usage. As an example, duplicate data may be present on the destination node as a result of a backup process that created a prior copy of the source node.

Illustrative examples of various de-duplication techniques may be found in U.S. Pat. No. 8,370,305 to Petrocelli and U.S. Pat. Pub. No. 2010/0094817 to Shaul, et al., both of which are hereby incorporated by reference in their entirety.

In some embodiments, a system in accordance with this disclosure pre-generates hash signatures on static local data. This data may be pre-existing, or may be randomly generated. Data locality may be determined by DAS, SAN, or LAN access at a particular site. However, the present disclosure is suitable to various levels of data locality where the methods herein lead to reduction in network usage.

In cases where data transfer is requested between a source node and a destination, node, a fingerprint database is generated at both nodes and stored locally to the respective node. In some embodiments, the fingerprint is the result of a known hash function, such as CRC, FNV, MD5, or SHA-256. In alternative embodiments, the fingerprints are not persisted on either the sender node or the receiver node. In such embodiments, fingerprints are generated as needed, for example, for only data being sent. The fingerprint databases, where present, may be used for de-duplication on the local node as described above.

The fingerprint for a data chunk (or other data element) is the result of a reproducible transformation of the data element. Some suitable transformation have the following additional properties: the transformation is one-way; the fingerprint is smaller in size than the original data element; and the transformation is such that there is a low risk of collisions between fingerprints for data elements that differ in their contents. Thus, a fingerprint may include, without limitation, a hash (sometimes referred to as a "hash signature"), a checksum, any cryptographic one-way function, or another value derivable from the data. Where the term hash is used, unless otherwise specified, such term is used generally, irrespective of the particular type of hash (cryptographic, random, rolling, etc.), or the hashing algorithm.

As described above, a data chunk refers to any division of a dataset (including a chunk comprising the entire dataset or a null dataset). Therefore, a chunk can include, without limitation, any data increment, regardless of data type, into which an operational unit of data (such as a file, database, or the contents of a physical storage unit) may be divided, for example, a block of physical storage, a track, sector, or cluster. Chunks may be of fixed, variable, or arbitrary size.

In various embodiments, fingerprints are persisted in data storage, for example in a database. Suitable data storage includes data containers, repositories and other data structures for data, including without limitation tables, arrays, associative arrays, lists, files, objects, relational databases, and non-relational databases.

In some embodiments, fingerprints are pre-generated based on static local data that is already present in the environment. In some embodiments, fingerprints are generated based on random data. Random data may be generated as part of the fingerprint generation process, may be generated ahead of time at a given node, or may be drawn from a specialized provider of random data. For example, random data may be provided from a specialized random data appliance. In another exemplary embodiment, random data is drawn from a shared data store. In some embodiments, a random data store is local to a given rack in a data center and is shared between servers on a rack. This shared source of random data may be used by each node local to that rack to generate an initial fingerprint database. It will be appreciated that in the course of transmission of data from a source node to a destination node, data locality has an impact on network utilization. Thus, a rack-local source of data for generating fingerprints or for transfer leads to reduced non-local network utilization.

In some embodiments, data is copied from any convenient source. For example, the data may be sourced or fashioned to have characteristics similar to anticipated data transfer. In this way, the database may be primed to have data likely to contain duplicates.

FIG. 1 provides an overview of an embodiment of the present disclosure. Data chunk 101 is located on target disk 102 and may form a portion of a larger dataset (not pictured). Target disk 102 is accessible to source node 103. As depicted, target disk 102 is located within source node 103. However, in various alternative embodiments, target disk 102 is accessible to source node 103 via a high speed local link, such as a fiber optic link within a rack, is accessible through a LAN, or is otherwise readable by source node 103.

Reader 104 reads data chunk 101 from disk 102. A fingerprint 105 is computed from the data chunk 101. Fingerprint 105, as discussed above, provides a unique signature of this chunk and may be a hash value. The hash value 105, once computed, is sent over network 106 to destination node 107. Hash value 105 is compared against values in a fingerprint database 108. If a matching entry is found in the database 108, an indication is sent to source node 103 that the data is already present and that the data chunk 101 need not be sent in whole.

When the fingerprint 105 is present at the destination node 107, the actual data is sourced from a data source 109 local to destination node 107. In various embodiments, the data is copied from data source 109 to target disk 110 to create new data chunk 111. In other embodiments, metadata of a filesystem of target disk 110 is updated to point to the data located on data source 109. In some embodiments, data source 109 is resident on target disk 110, and in some embodiments is the entirety of the data resident on disk 110.

When the fingerprint 105 is not found in the database 108, a message is sent to source node 103 to send data 101. In some embodiments, a batch of fingerprints is sent to the destination node at once for bulk processing.

To generate dataset 109, various methods are employed. Although it is possible to pre-generate every possible data combination for a data chunk, the storage necessary would, in most cases, be prohibitive. For example, for a 64-byte block of data, there are approximately, $2^{8*64}$ combinations of data. To store these combinations would require $7.62 \times 10^{140}$ PB (1 petabyte=1000 terabytes) of data storage. This would not be economical or feasible.

The present subject matter does not require a 100% hit rate on the hash database. Even a modest hit rate enables the elimination of costly data transfer. In various embodiments, the hash database is adapted to represent a larger dataset then is physically stored to increase the effective rate of hash hits between source and destination, without increasing the size of the local data.

In some such embodiments, the traversal pattern across the data is varied when generating a fingerprint. For example, given a hash function, linear traversal of a static dataset produces one combination of hash signatures that represent data. Traversing using varying bit offsets produces more hash values than sequential traversal. Thus, the hash database may represent a larger dataset than it is generated from. Traversing the dataset in reverse bit order produces another varying dataset. Traversing using a pseudorandom function using a random seed produces yet another dataset. Provided that a fingerprint is stored with a specification of the traversal pattern, the traversal pattern can be reproduced at a later time in order to reconstitute the data that generated a given fingerprint.

In various embodiments, the traversal patterns may be striping or staggering. However, alternative traversal patterns may be used according in accordance with the present disclosure. In general, data may be adapted by applying any transformation to the chunks of a dataset prior to generating the additional fingerprints, and providing a record for determining (or having another indication of) what transformation was applied to generate the fingerprints.

In one embodiment, an implementation as described above may be implemented through the use of a data structure such as that provided in Inset 1.

---

Inset 1 hash data bank record
{
    SHA256hash32bytes,   (hash of data block)
    increment bit   7 bits,   (how many bits to skip between each data chunk,0 to 64 increment, and 64 to 128 for random seeding increment )
    bit order   1 bit,   (0=forward bit order, or 1=reverse bit order)
}

---

It will be understood that the particular composition, field sizes and layout of the above data structure are not required for the operation of the system of the present disclosure. The selection of SHA-256 as a hash function is likewise not necessary to the operation of the system of the present disclosure. The record layout shown represents only a convenient representation of one particular set of data elements selected to set up a representative set of variations for generating alternative fingerprints for a given dataset.

Figure 2:
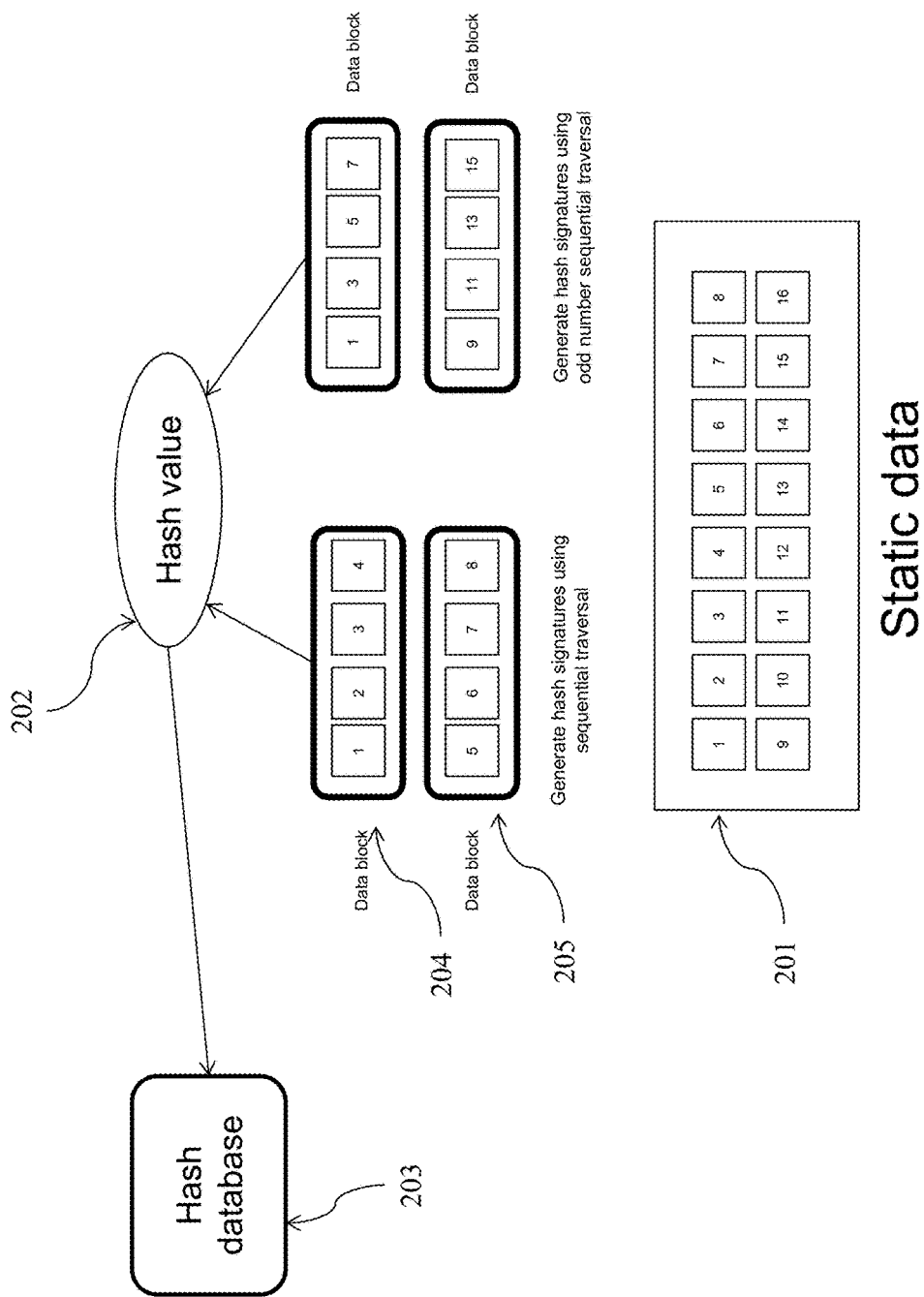
FIG. 2 is a block diagram showing examples of different alternatives for hash generation in accordance with several embodiments.

FIG. 2 illustrates hash generation using differing traversal patterns. Based on static data 201, a hash value 202 is generated and then stored in hash database 203. Static data 201 includes numbered bits 1-16. In a first variation, static data 201 is traversed by sequential traversal, to yield blocks 204, 205 containing bits 1-4 and 5-8, respectively. In a second variation static data is traversed while skipping every other bit. This results in blocks 206, 207 containing bits 1, 3, 5, 7 and 9, 11, 13, 15, respectively. In this manner, more data patterns than are physically present in the local static data 201 may be represented in hash database 203.

Figure 3:
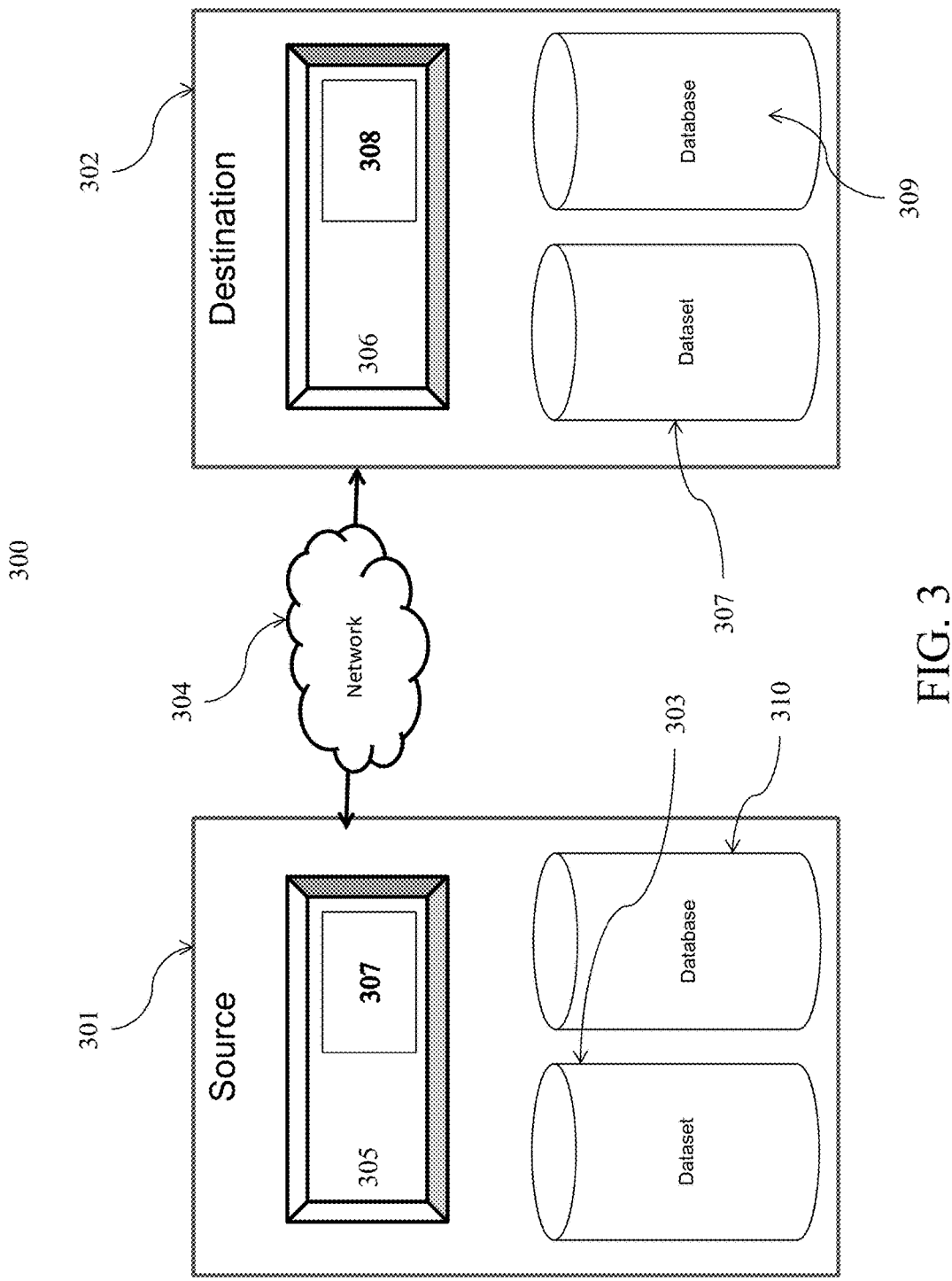
FIG. 3 is a block diagram showing an exemplary system in accordance with an embodiment of the disclosed subject matter.

Referring to FIG. 3, a system according to embodiments of the present disclosure is depicted. System 300 includes source network endpoint 301 and a destination network endpoint 302. System 300 is operable for transferring a dataset 303 over a network 304 between source and destination network endpoints, 301 and 302. System 300 may include source processor 305 at the source network endpoint and a destination processor 306 at the destination network endpoint.

Dataset 307, which is accessible to destination processor 306, corresponds to dataset 303. However, dataset 307 may not exist in all cases.

Processors 305 and 306 execute logic 307, 308 for performing various operations upon local data (i.e., data accessible to the respective processors) and input-output operations including communications over network 304. In some embodiments, the logic is encoded in a computer readable medium.

Logic 307 and 308 may include logic for dividing the local dataset into one or more chunks. At least logic 308 on the destination processor 306 includes logic for generating a fingerprint from a chunk and storing the fingerprint and data associating the fingerprint with the chunk in a database 309 recorded on a non-transitory storage medium. In some embodiments, logic 307 on the source processor 305 includes such logic as well.

Logic 307 on source processor 305 may include logic to send the fingerprints for the chunks over network 302 to the destination processor 306.

Logic 308 on destination processor 306 may include logic to determine if a fingerprint received from source processor 305 matches a fingerprint in database 309, and if not, to supply an indication to source processor 305 to send the associated data chunk. Such an indication to send may comprise, for example, an explicit communicated request to send a specified chunk, or a bit, flag, or other data that is set or included in a data element under control of destination processor 306, which will eventually be sent to source processor 305, and serve as an indication to source processor 305 to send the corresponding chunk to destination processor 306.

Logic 307 on source processor 305 may include logic to send data chunks to destination processor 306 responsive to indications to send received from destination processor 306. Logic 308 on destination processor 306 may include logic to batch transmission of the indications to send. Logic 307 on source processor 306 may include logic to process such batches.

Logic 308 on destination processor 306, and possibly logic 307 on source processor 305, may include logic to cause fingerprints to be generated for the database on the local version of the dataset (301 or 307) prior to the initiation of the transferring of the dataset from the source network endpoint.

Logic 308 on destination processor 306 may include logic to generate arbitrary data if dataset 307 is empty or below a predetermined threshold size. Logic on at least destination processor 306, and in some embodiments on source processor 305, includes logic to generate and store in the database at least one additional fingerprint per chunk based on a data transformation of the chunk and to store in the database an identification of the data transformation.

Figure 4:
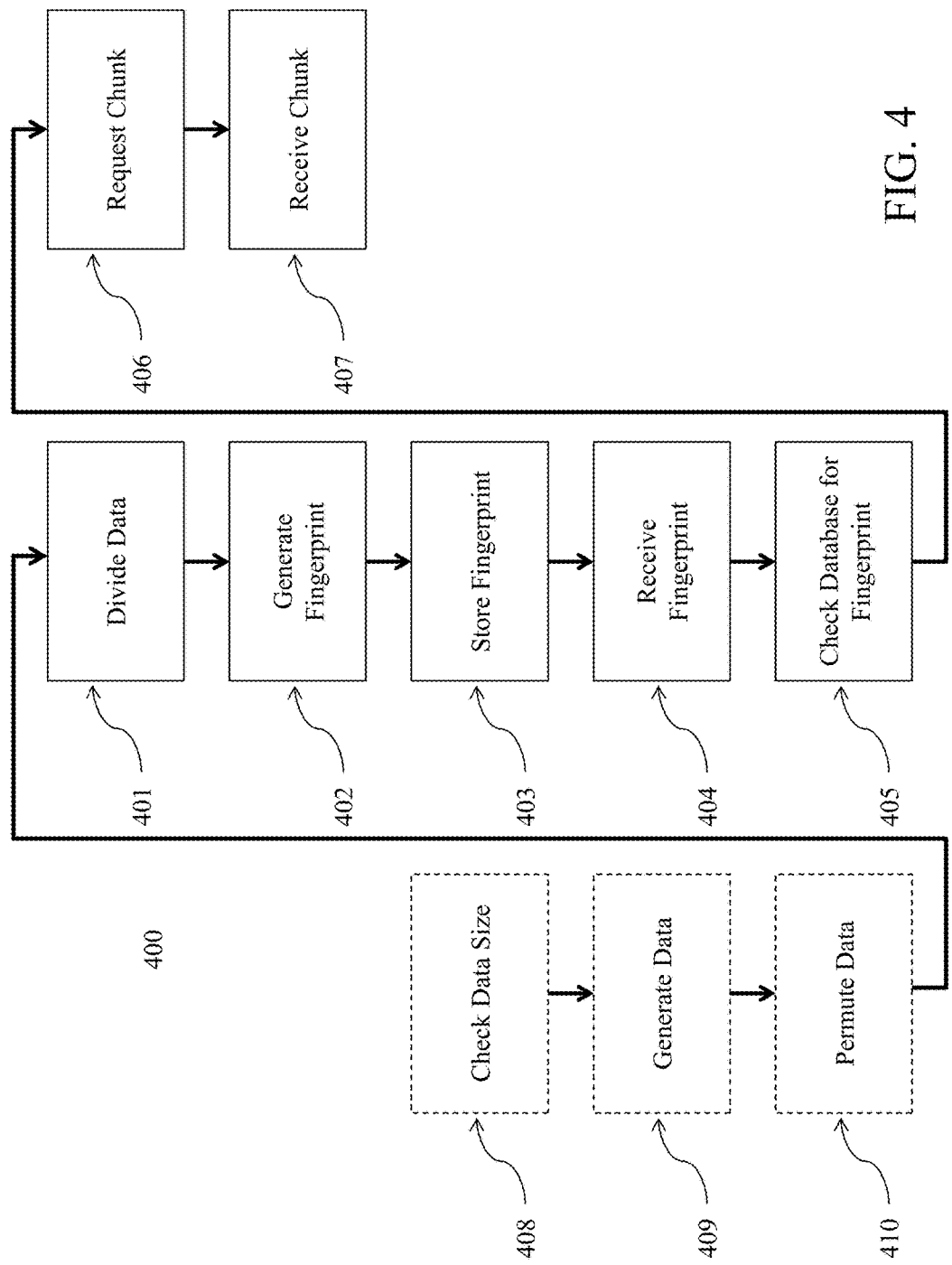
FIG. 4 is a flowchart showing an exemplary method in accordance with an embodiment of the disclosed subject matter.

FIG. 4 is a flowchart representing an exemplary method 400 according to an embodiment of the disclosed subject matter. Method 400 may be employed for transferring a dataset over a network between source and destination network endpoints.

A local dataset is divided 401 into one or more chunks. A fingerprint is generated 402 from a chunk and the fingerprint and data associating the fingerprint with the chunk is stored 403 in a database, which in some embodiment is recorded on a non-transitory storage medium. In some embodiments, step 403 is performed the source network endpoint as well as the destination endpoint.

A fingerprint is received 404, indicating a chunk to be copied. The database is checked 405, to determine whether the received fingerprint is already present. If not, an indication is supplied 406 to the source processor to send the associated data chunk. Such indications may include, for example, an explicit communicated request to send a specified chunk, or a bit, flag, or other data that is set or included in a data element under control of the destination processor, which will eventually be sent to the source processor, and serve as an indication to the source processor to send the corresponding chunk to the destination processor. In response to the request 406, a chunk is received 407.

Multiple iterations of steps 404-407 may be handled in a batching manner. In such cases, multiple fingerprints may be received in one communication, and multiple indications to send chunks may be sent in one communication. Similarly, multiple data chunks may be received in one communication.

In some embodiments, prior to step 401, the local data store is checked 409 to determine whether it is empty, or contains less than a predetermined amount or quality of data. If the available data is less than a predetermined size, a dataset is generated 410.

In some embodiments, permutations of the data are computed 410. As discussed further above, the various permutations of the data may be based on a variable traversal order. Fingerprints based on these various traversal orders are stored in the database on the sender or receiver. As described further above, the fingerprint database may be maintained on a data sender, data receiver, or both in order to facilitate data transfers in accordance with the present disclosure.

While various embodiments have been described, it should be understood that they have been presented by way of example and not limitation. It will be apparent to persons skilled in the relevant art(s) that various changes in form and detail can be made therein without departing from the spirit and scope of the disclosed subject matter. Thus, the present embodiments should not be limited by any of the above-described embodiments. Accordingly, it is intended that the disclosed subject matter include modifications and variations that are within the scope of the claims appended to (and forming a part of) this disclosure, and their equivalents.

What is claimed is:

1. A method for minimizing network usage during data transfer over a network between a source node and a destination node, the method comprising:
   pregenerating a plurality of data chunks at the destination node, the plurality of data chunks comprising a first data chunk;
   storing the plurality of data chunks in a computer readable medium at the destination node;
   generating a plurality of hash values of the first data chunk based on different traversal orders of the first data chunk at the destination node;
   storing the plurality of hash values and specifications of the traversal orders in a data store at the destination node; and
   reconstituting, at the destination node, a second data chunk identical to a source data chunk without receiving the source data chunk from the source node, thereby minimizing network usage, wherein reconstituting comprises:

receiving a source hash value from the source node, the source hash value being a hash of the source data chunk;

determining that the source hash value is present among the plurality of hash values in the data store at the destination node, wherein determining comprises comparing the source hash value to the plurality of hash values at the destination node to determine when one of the plurality of hash values matches the source hash value;

creating the second data chunk based on the source hash value and the specifications of traversal order in the data store.

2. The method of claim 1, wherein pregenerating the plurality of data chunks comprises randomly generating data.

3. The method of claim 1, wherein creating the second data chunk comprises applying the specifications of traversal order to the plurality of data chunks.

4. The method of claim 1, wherein the data store is a database.

5. The method of claim 1, wherein the source hash value is received via the network.

6. The method of claim 1, further comprising:
receiving a batch of source hash values, the batch comprising the source hash value.

7. The method of claim 1, further comprising:
receiving an additional source hash value;
determining that the additional source hash value is not present in the data store;
requesting a third data chunk corresponding to the additional source hash value via the network from the source node.

8. A computer program product for minimizing network usage during data transfer over a network between a source node and a destination node, the computer program product comprising a computer readable storage medium having program instructions embodied therewith, the program instructions executable by a processor to cause the processor to:

pregenerate a plurality of data chunks at the destination node, the plurality of data chunks comprising a first data chunk;

store the plurality of data chunks in a computer readable medium at the destination node;

generate a plurality of hash values of the first data chunk based on different traversal orders of the first data chunk at the destination node;

store the plurality of hash values and specifications of the traversal orders in a data store at the destination node; and reconstitute, at the destination node, a second data chunk identical to a source data chunk without receiving the source data chunk from the source node, thereby minimizing network usage, wherein reconstituting comprises:

receive a source hash value from the source node, the source hash value being a hash of the source data chunk;

determine that the source hash value is present among the plurality of hash values in the data store at the destination node, wherein determining comprises comparing the source hash value to the plurality of hash values at the destination node to determine when one of the plurality of hash values matches the source hash value;

create the second data chunk based on the source hash value and the specifications of traversal order in the data store.

9. The computer program product of claim 8, wherein pregenerating the plurality of data chunks comprises randomly generating data.

10. The computer program product of claim 8, wherein creating the second data chunk comprises applying the specifications of traversal order to the plurality of data chunks.

11. The computer program product of claim 8, wherein the data store is a database.

12. The computer program product of claim 8, wherein the source hash value is received via the network.

13. The computer program product of claim 8, the program instructions further executable by the processor to cause the processor to:
receive a batch of source hash values, the batch comprising the source hash value.

14. The computer program product of claim 8, the program instructions further executable by the processor to cause the processor to:
receive an additional source hash value;
determine that the additional source hash value is not present in the data store;
request a third data chunk corresponding to the source hash value via the
network from the source node.

15. A system for minimizing network usage during data transfer over a network, the system comprising:
a source node; and
a destination node in communication with the source node via the network, the destination node comprising a computer readable storage medium having program instructions embodied therewith, the program instructions executable by a processor to cause the processor to:

pregenerate a plurality of data chunks at the destination node, the plurality of data chunks comprising a first data chunk;

store the plurality of data chunks in a computer readable medium at the destination node;

generate a plurality of hash values of the first data chunk based on different traversal orders of the first data chunk at the destination node;

store the plurality of hash values and specifications of the traversal orders in a data store at the destination node; and reconstitute, at the destination node, a second data chunk identical to a source data chunk without receiving the source data chunk from the source node, thereby minimizing network usage, wherein reconstituting comprises:

receive a source hash value from the source node, the source hash value being a hash of the source data chunk;

determine that the source hash value is present among the plurality of hash values in the data store at the destination node, wherein determining comprises comparing the source hash value to the plurality of hash values at the destination node to determine when one of the plurality of hash values matches the source hash value;

create the second data chunk based on the source hash value and the specifications of traversal order in the data store.

* * * * *